US 6,576,141 B2

(12) United States Patent
Turner, Jr. et al.

(10) Patent No.: US 6,576,141 B2
(45) Date of Patent: Jun. 10, 2003

(54) APPARATUS AND METHOD FOR COLLECTING FLOATING DEBRIS

(75) Inventors: Richard R. Turner, Jr., Bloomfield, NJ (US); Robert Kircher, Clark, NJ (US); Dennis R. Moran, Caldwell, NJ (US)

(73) Assignee: Fresh Creek Technologies, Inc., Cedar Grove, NJ (US)

( * ) Notice: Subject to any disclaimer, the term of this patent is extended or adjusted under 35 U.S.C. 154(b) by 7 days.

(21) Appl. No.: 09/875,346

(22) Filed: Jun. 6, 2001

(65) Prior Publication Data

US 2002/0185449 A1 Dec. 12, 2002

(51) Int. Cl.⁷ .............................................. E02B 15/06
(52) U.S. Cl. ........................ 210/747; 210/156; 210/162; 210/170; 210/242.1; 405/63; 405/70
(58) Field of Search .................................. 210/154, 156, 210/162, 170, 747, 242, 1; 405/63, 70

(56) References Cited

U.S. PATENT DOCUMENTS

| | | | | |
|---|---|---|---|---|
| 3,579,994 A | * | 5/1971 | Preus et al. ................... | 405/70 |
| 3,667,235 A | * | 6/1972 | Preus et al. ............... | 210/242.1 |
| 3,779,385 A | * | 12/1973 | Strohecker ............... | 210/242.1 |
| 3,839,869 A | * | 10/1974 | Green ......................... | 403/70 |
| 4,084,380 A | * | 4/1978 | Hallhagen .................... | 405/70 |
| 5,071,286 A | * | 12/1991 | Separovich .................. | 405/70 |
| 5,580,185 A | * | 12/1996 | Ware ........................... | 405/63 |
| 5,893,978 A | * | 4/1999 | Yoda et al. .................. | 210/170 |

OTHER PUBLICATIONS

Fresh Creek Technologies, Inc., *Shorelines Newsletter*, vol. 2, No. 3, Summer 1993.

* cited by examiner

*Primary Examiner*—Christopher Upton
(74) *Attorney, Agent, or Firm*—Wood, Herron & Evans, L.L.P.

(57) ABSTRACT

A floating system for collecting floatable debris is provided with curtains that direct the flow of water that contains floatables into the traps of the system while functioning as a pressure relief mechanism for the system which avoids placing excessive hydraulic forces on the system under extreme flow conditions. Inlet flow confining curtains have means for allowing the curtain to lift from the bottom of the waterbody as flow becomes progressively more extreme. The means may include patterns of weights in a series of normally horizontal pockets that are fabricated into the curtain at various distances below the water level that hang down to the bottom of the waterbody under normal conditions. The weights are graduated with the heaviest at the top and the lightest at the bottom. Alternatively, openings or windows are formed in the curtain and covered with mesh to allow flow through the windows while containing floatables larger than the size of the openings in the mesh. Also, a vertical corner of the curtain may have a triangular-shaped pucker pocket that extends from the surface of the water to the bottom of the curtains, which allows the two curtains to lift.

18 Claims, 6 Drawing Sheets

APPARATUS AND METHOD FOR COLLECTING FLOATING DEBRIS

The present invention generally relates to the collection and removal of floatable debris and, more particularly, to structure for directing water flow into the inlets of the traps of such debris removing systems.

BACKGROUND OF THE INVENTION

Trash and debris floating on the surfaces of waterways or along shorelines and beaches is a highly visible form of water pollution, which is receiving attention for its adverse, polluting effect and for its unaesthetic appearance on the surfaces of lakes and other water bodies. One type of system for the collecting and removing of floating debris has consisted of arrays of disposable mesh nets installed in receiving bodies of water in the flow path of a sewer outlet, particularly in applications referred to as "Combined Sewer Overflows" or "CSOs". Such systems are described in Vol. 2, No. 3, of Fresh Creek Technologies, Inc. "Shorelines" newsletter. Systems of this type are effective in collecting floatables or trash for removal and are shown in Fresh Creek Technologies, Inc. Netting Trashtrap™ Product Bulletin. Improvements in such devices are described in U.S. Pat. No. 5,562,819, owned by the assignee of the present application, which provides an underground, in-line apparatus for trapping and collecting debris in a sewer or storm flow conduit, a secondary trap which provides continued protection when primary collection traps are full, a system which signals when primary bags or nets are full and servicing is required, and a trapping facility in which bags or nets may be replaced without loss of trapping protection during servicing.

More specifically, the device in the patent referred to above includes an enclosure or chamber with an inlet and an outlet each adapted to be connected to a sewer, storm drain conduit or outflow. A debris removing system is disposed within the chamber between the inlet and the outlet for trapping and collecting water borne debris entering at the inlet and thereby providing for an outflow of substantially debris-free water. The enclosure includes an access opening comprising upper doors or hatches or access hatches in the enclosure sized to allow the debris removing system to be removed and replaced. The debris removing system specifically includes a perforated container having an open end facing the inlet of the chamber. The perforated container includes a netting assembly that traps and collects the trash or floating debris. The container is in the form of a netting assembly having a flexible bag-shaped mesh net attached to a frame. The netting assembly is attached to lifting structure having supports or handles for allowing the frame and net to be lifted out when the net is full of captured debris. In some applications, a bypass weir or screen is provided to normally direct flow from the chamber inlet through the open end of the net while allowing flow to bypass the net and flow to the chamber outlet when the net is full of debris.

Sensing and signaling elements are typically provided for sensing and signaling the passage of solid debris around the net when the net is full of debris and is in need of servicing. The sensing and signaling elements may include mechanical structure which permits passage of water, but is displaced by impingement of solid debris flowing around the nets. Displacement of such mechanical structure signals when the net is full of debris, for example, by actuating a visible flag above ground or by actuating an electrical switch which activates an aboveground indicator or remote indicator. The sensing and signaling may include an optical sensor for detecting the passage of debris around the netting assembly. Upon detection of debris, the optical sensor emits a signal indicating that the trap is full of debris. The signal may also activate an aboveground indicator or a remote indicator.

Multiple trap systems are employed in which the enclosure includes side-by-side trap assemblies. Such systems may be configured such that, upon filling of the first trap, the flow and debris can be diverted over a bypass weir disposed between the inlet ends of the first and second traps so that flow is thereby directed through the second trap and overflow debris is trapped and collected. Closure panels may be provided in a stationary frame structure disposed adjacent the inlet ends of the traps in either the single-trap systems or the multitrap systems to restrain debris from flowing through the chamber during servicing.

Floating systems for the removal of floatables or trash are positioned in a body of water in front of an outfall such as a stream or storm sewer conduit through which water flows into the waterbody. The systems are oriented with the mouths of the disposable nets facing the outfall. The system includes a structure that floats on the surface of the water to hold the nets horizontally in the water. The flow is directed toward the mouths of the nets through a funnel-shaped structure in front of the floating structure. The energy of the flow drives the floatables into the disposable nets where they are captured and can be removed. The number of nets in a given system is chosen to handle the anticipated flow from the outfall under specified conditions and to avoid excessive flow velocities in the individual nets.

Floating systems are installed in waterways that have variable water elevations due to tides or other flow patterns. To prevent floatables from escaping around or under the system, weighted curtains are attached to floating booms attached between the shore headwall, on opposite sides of the outfall, and the front corners of the unit and below the mouths of the nets, with the unit facing the outfall. Under designed flow conditions, these curtains direct the flow from the outfall into the mouth of the disposable nets. The curtains extend or hang vertically from the units and the floating booms to the bottom of the waterbody. The vertical length of the curtains is such that they will reach the water bottom under a specified water elevation such as extreme high tide or the 100-year flood elevation.

Under extreme flow conditions, the energy of the flow can place excessive hydraulic forces on the system. Since design of the system for the worst case flow is impractical, a need exists for a method of providing relief to structurally protect the system.

SUMMARY OF THE INVENTION

A primary objective of the present invention is to provide relief to structurally protect the system under extreme flow conditions and under the worst case flow.

According to principles of the present invention, a floating debris collecting system is provided with curtains that direct the flow of water that contains floatables into the traps of the system while functioning as a pressure relief mechanism for the system which avoids placing excessive hydraulic forces on the system under extreme flow conditions.

In one embodiment of the invention, inlet flow confining curtains are provided with patterns of weights to cause the curtain to hang in an optimal manner for preventing floatables from bypassing the traps of the system while allowing extreme water flow at depths that are less likely to carry floatables to find a low flow resistance path around the traps. In particular, curtains are provided that are weighted in a manner that causes them to lift off of the water bottom when the velocity of the water and the pressure on the curtains reach predetermined levels. As the lifting occurs, some of the flow of the water pases under the curtains, thereby providing pressure relief. This is achieved by placing weights in the curtain in a series of nominally horizontal pouches or pockets that are fabricated into the curtain at various distances below the water level that hang down to the bottom of the waterbody under normal conditions. The weights are graduated with the heaviest at the top and the lightest at the bottom. This progressive weighting causes the curtain to lift first at the bottom, thus causing the bypass to occur nearest the water bottom, where floatables are less likely to be present, providing pressure relief while minimizing the floatables that escape as the bypass occurs.

In another embodiment of the invention, curtains are provided having openings or windows formed therein that are covered with a mesh material of approximately the same aperture as the mesh of the nets. These windows allow flow through the windows while containing floatables larger than the size of the openings in the mesh. The positions and size of the windows are determined so as to provide a desired pressure relief while still directing the flow into the disposable nets of the traps.

In a further embodiment of the invention, curtains are provided with the vertical corner that is formed by the junction of the side curtain and the funnel curtain constructed with a triangular-shaped pucker pocket that extends from the lower corner of the floating structure to the bottom of the curtains. This pucker pocket allows the two curtains to lift and open at these corners while still containing the floatables that are more likely borne near the surface of the water.

These and other objectives and advantages of the present invention will be more readily apparent from the following detailed description of the of the preferred embodiments of the invention, in which:

DETAILED DESCRIPTION OF THE PREFERRED EMBODIMENT

Figure 1:
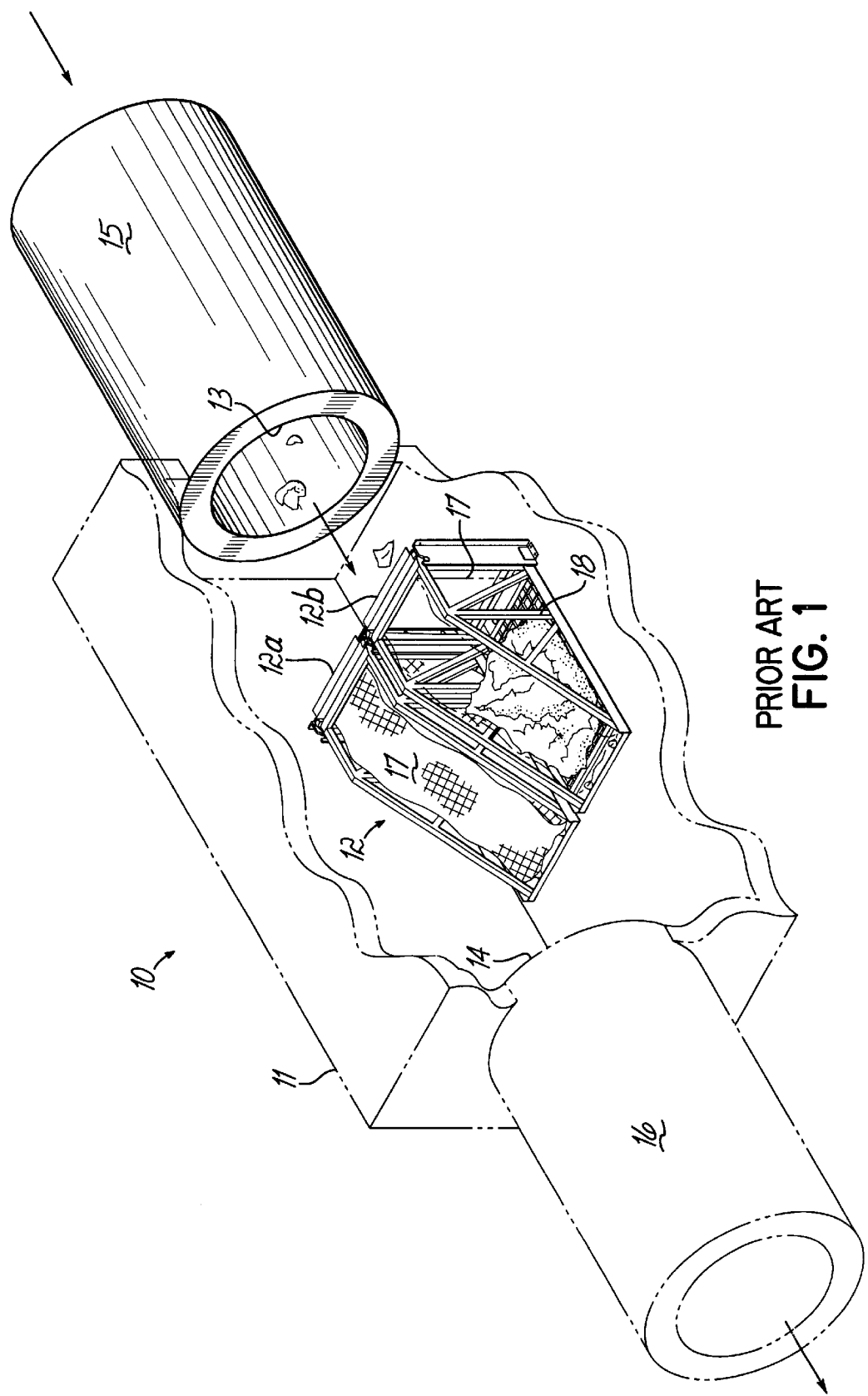
FIG. 1 is a perspective view showing the common features of a debris removal system of the prior art.

FIG. 1 illustrates the basic components of one system 10 of the prior art described in the background of the invention above. The system 10 includes one or more traps 12, illustrated as two in number, separately designated as traps 12a and 12b. The traps 12a,12b are located within a flow-constraining housing or enclosure 11 between inlet 13 and outlet 14 thereof. The inlet 13 and the outlet 14 are each respectively connected in a known manner to conduits 15 and 16, which may be storm drain or combined sewer conduits or other structures or the terrain of the site. The traps 12a,12b each include a netting assembly 19 formed of a bag-shaped mesh net 17 that is attached to a lifting basket 18. Each of the netting assemblies 19 captures and holds floatable velocity borne debris 20 entering enclosure 11 through inlet 13. The arrows 25 indicate the direction of water flow.

Perforations or openings in nets 17 may vary in size depending on the intended use, with sizes generally in the range of from about 0.1" to about 2". Nets 17 are open on the upstream facing end 17a thereof, toward inlet 13 of enclosure 11. Upper support members (not shown in FIG. 1) are attached to lifting baskets 18 for allowing the netting assemblies 19 of traps 12a,12b to be lifted out of enclosure 11 for periodic removal of captured debris. The netting assemblies 19 are configured such that the nets 17 provide a large filter area for the size of the mouth, thereby minimizing head loss. For example, 80 square feet of net 17 may be provided for a netting assembly mouth area of 6½ square feet, resulting in a pressure drop across each net 17 of three or four pounds.

A bypass weir (not shown in FIG. 1) or screen is typically located upstream of traps 12 and on one side of inlet 13 to permit continued flow in the event that the nets 17 of traps 12a, 12b are filled to capacity with debris. To signal that nets 17 of the netting assemblies 19 of traps 12a, 12b are in need of replacement or emptying, sensing and signaling mechanisms may be provided. The multiple trap system 10 can be configured to provide continuous and uninterrupted capture of debris through second trap 12b after the netting assembly of first trap 12a has been filled and during the process of removing and replacing it. While servicing is being performed, movable panels can be positioned in front of each respective trap 12a or 12b being serviced, as necessary, prior to its removal from enclosure 11. In this way, the system 10 is protected against passage of floatable debris during net removal and replacement.

Figure 1A:
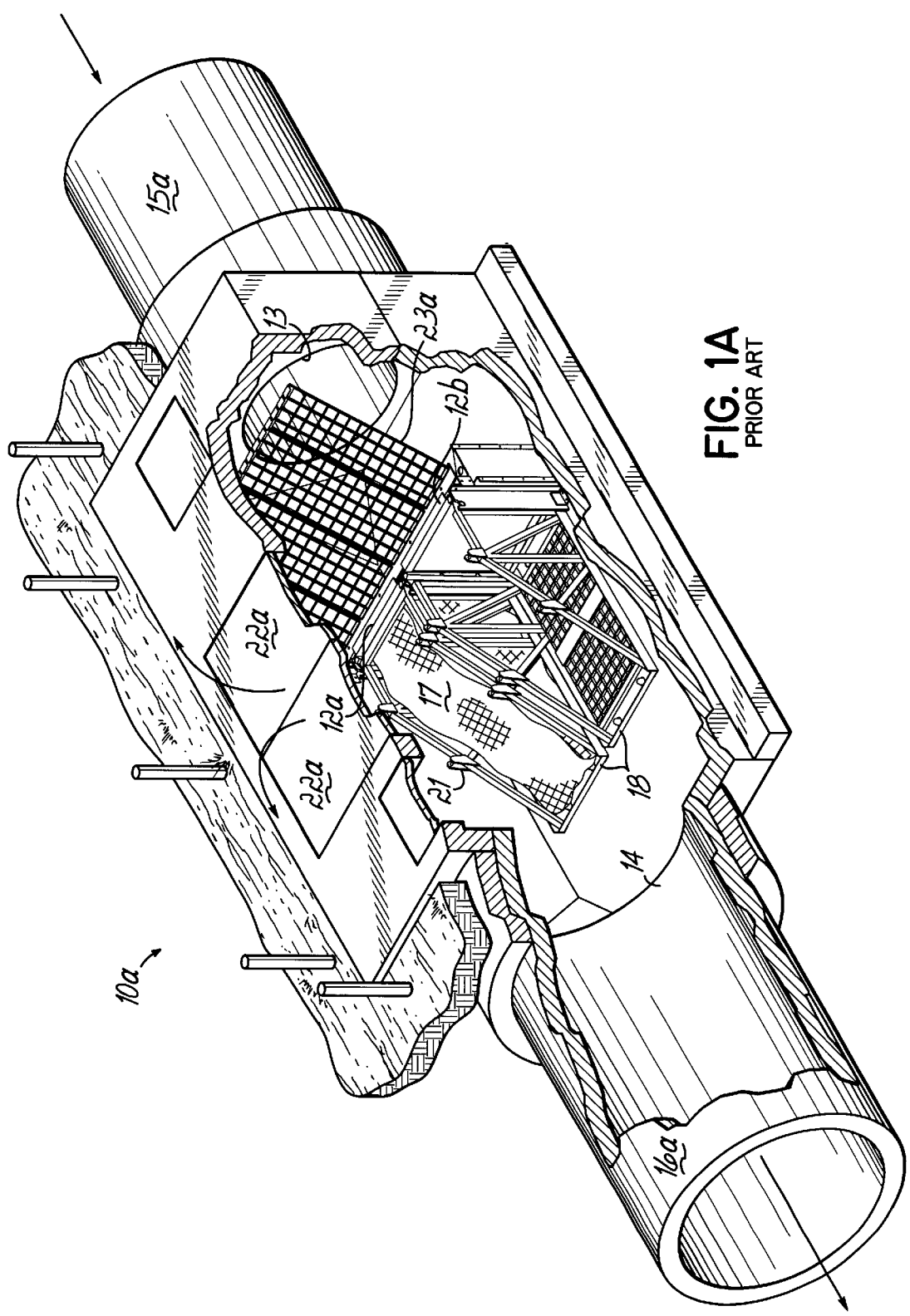
FIG. 1A is an underground in-line version of the prior art system of FIG. 1.
Figure 1B:
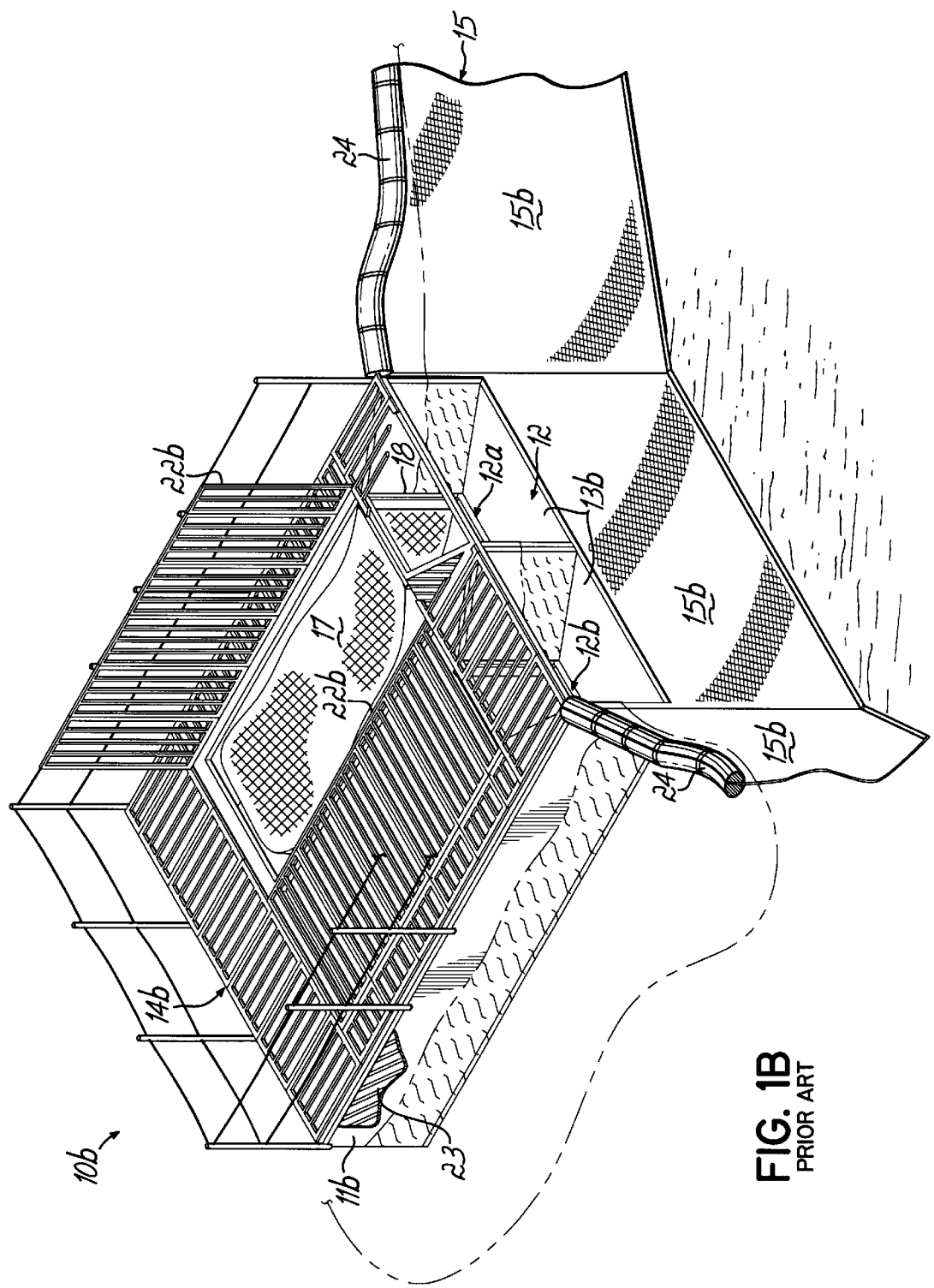
FIG. 1B is a floating version of the prior art system of FIG. 1.
Figure 1C:
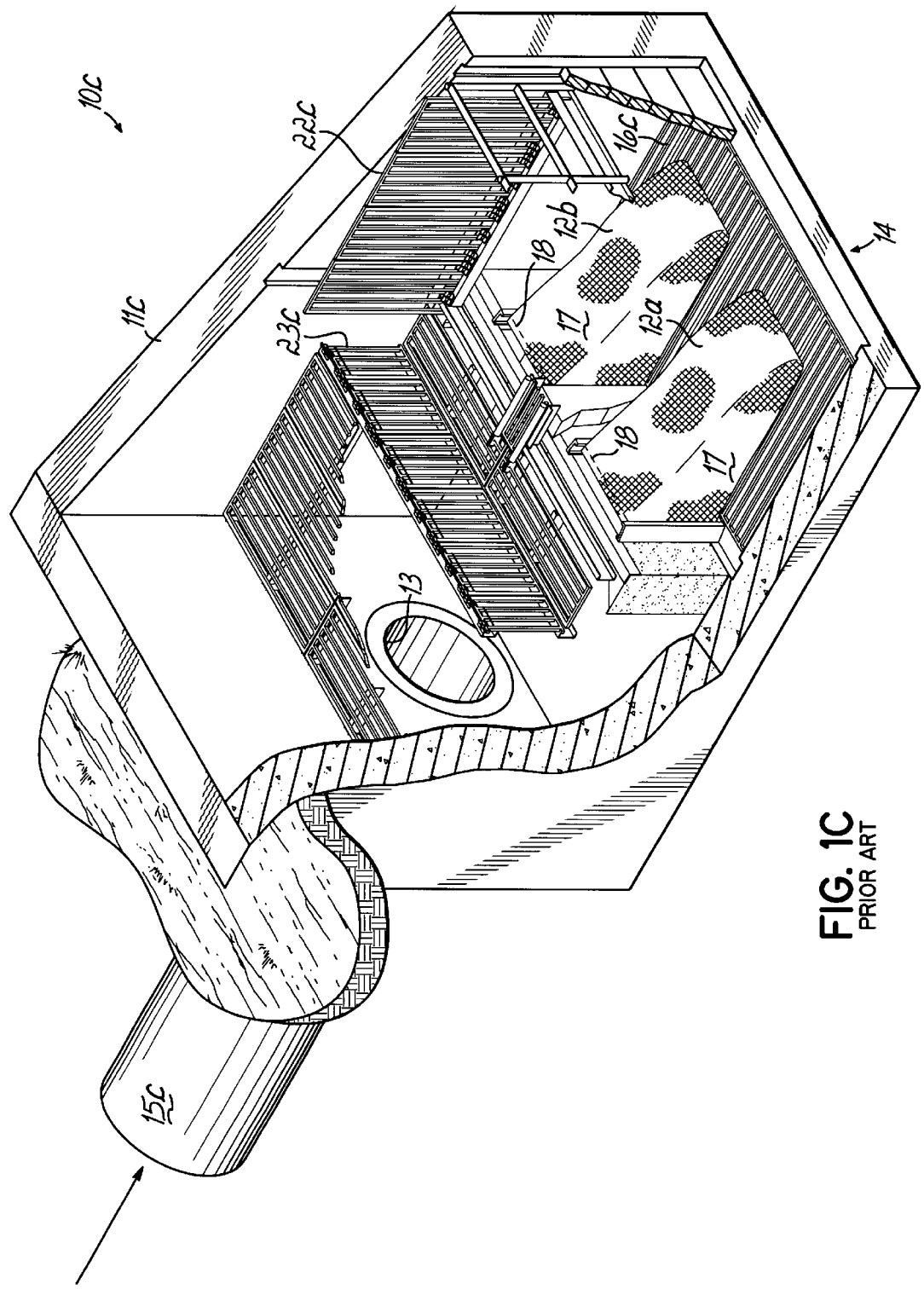
FIG. 1C is an end-of-pipe version of the prior art system of FIG. 1.

FIGS. 1A–1C illustrate the basic system 10 of the prior art in three environments. These arrangements are generally described in a publication of the United States Environmental Protection Agency, Office of Water, No. EPA 832-F-99-037, September, 1999, hereby expressly incorporated by reference herein.

In particular, in FIG. 1A, an in-line system 10a is illustrated in which the two traps 12a,12b are contained in an enclosure in the form of an underground or subterranean vault 11a. The vault 11a includes its inlet 13a and its outlet 14a respectively connected to conduits in the form of buried pipes 15a, 16a, for example, of a storm drain. The in-line traps 12a, 12b each include a netting assembly 19 with a mesh net 17 installed in and held in place by a respective lifting basket 18. A lifting bridle (not shown) is attached to upper support members 21 of the lifting basket 18 for allowing the netting assemblies 19 of traps 12a and 12b to be lifted out of vault 11a through doors 22a for periodic removal of captured debris. A bypass screen 23a is located above the traps 12a,12b to allow flow to divert from the inlet 13a to permit continued flow in the event that nets 17 of the traps 12a, 12b are both filled to capacity with debris.

In FIG. 1B, a floating system 10b is illustrated that is configured to float in a body of water in front of a stream, pipe or other water source from which enters into the body of water a flow of water containing trash or floatables to be removed by the system. The direction of water flow into and through the system 10b is also indicated by arrows 19. The floating system 10b also includes two traps 12a,12b, shown in a floating hull 11b that is provided with closed cell foam panels 23 and pontoons to float the hull at the surface 28 of the body of water. The traps 12a,12b also each include a mesh net 17 held in place within a lifting support 18a. Because the system 10b is floating and the traps 12a,12b are immersed in water, a less extensive support frame 18a is substituted for the lifting basket 18 of system 10a, described above.

In the system 10b, the hull 11b has its inlet 13b extending above and below the surface 28 of the water so that trash or floatables at and immediately below the surface enter through it into the interior of the hull 11b. The hull 11b has its outlet 14b below the water surface 28 on the back of the hull 11b. The inlet conduit 15 is formed of a set of curtains 15b which hang from below the inlet 13b and from floats 24 extending respectively between the hull 11b on both sides of the inlet 13b to the shore on the opposite sides of the flowing source, connected to buried concrete conduits (not shown) of a storm drain, for example. The curtains 15b may extend from the water surface 28 to the bottom 29 of the water body and channel water from the source into the inlet 13b. The traps 12a, 12b are supported in the hull 11b in a manner similar to the way they are supported in the vault 11a described above. They can be lifted out of hull 11b through grate doors 22b for periodic removal of captured debris from the nets 17 thereof.

In FIG. 1C, an end-of-pipe system 10c is illustrated in which the two traps 12a,12b are shown in an enclosure in the form of a surface mounted three-sided concrete headwall and knee wall enclosed cavity 11c having an open end that defines its outlet 14c. The cavity 11c has its inlet 13c connected to a pipe 15c draining into the cavity 11c. The traps 12a, 12b each include a net assembly 19 having a mesh net 17. A fiberglass drain grating 16c is provided beneath the netting assemblies 19 to allow flow to exit each net 17 through its bottom to the outlet 14c of the enclosure tic. The net 17 of each netting assembly is attached to a lifting structure (not shown), which may be similar to the lifting basket 18 described in FIG. 1A above, or in the form of lifting frame 18a described in FIG. 1B above where the traps 12a,12b are submerged. Door grates 22c are provided above the traps 12a, 12b to permit them to be raised for periodic removal of captured debris. A bypass weir 23c may be located above the traps 12a,12b to allow flow to divert from the inlet 13 to permit continued flow in the event that traps 12a, 12b are both filled to capacity with debris.

Referring more particularly to the floating system 10b of FIG. 1B, the flow of water from the outfall into the inlet 13 of the system 10b causes pressure against the curtains 15b that hang from below the inlet 13 and the floats 24 that extend between the hull 11b and to the shore on the opposite sides of the flowing source. Under normal flow conditions, the curtains 15b channel substantially all of the inflowing water from the source into the inlet 13 along with the floatable debris it carries. When the flow is extreme, however, the pressure on the curtains 15b becomes greater, and either the water finds a way around the curtains and carries floating debris around the traps 12, or the curtains 15b fail. Failure not only allows the flow of debris to bypass the system 10b while the extreme flow conditions persist, but leaves the system 10b in a nonfunctional and ineffective state when the flow conditions return to normal.

Figure 2:
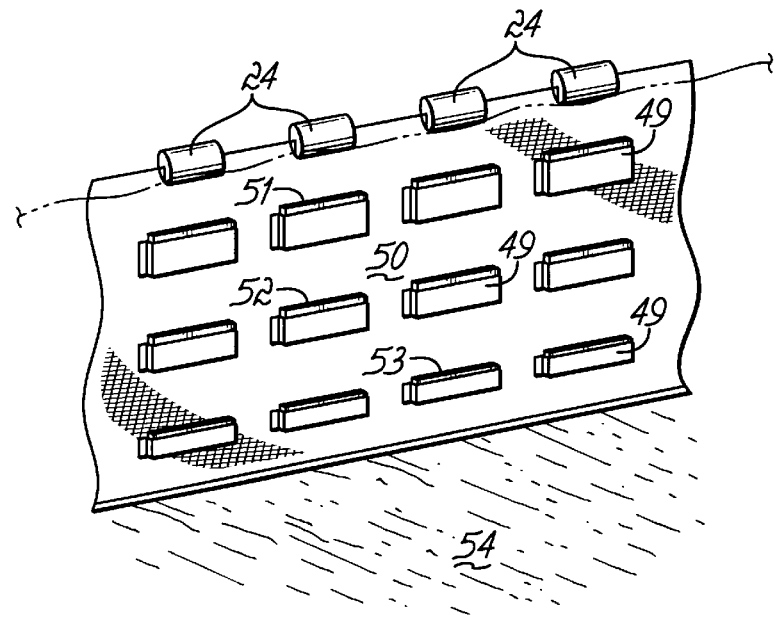
FIG. 2 is a perspective view of one embodiment of a curtain for a floating system, of the type illustrated in FIG. 1B, for removing floatable debris according to certain principles of the present invention.

FIG. 2 illustrates a curtain 50, according to one embodiment of the invention, to replace the curtain 15b in the system 10b of FIG. 1B. The curtain 50 may be one continuous piece, or may be formed in segments, one hanging from each of the floats 24 and one from below the traps 12. Preferably, the curtain 50 is assembled in segments that are joined with the pucker pocket feature described in connection with FIG. 4 below. The curtain 50, when hanging from the floats 24 to the bottom 54 of the waterbody, substantially prevents the flow of water therethrough. The curtain 50 has weights distributed over its surface, such as, for example, an array of weights fixed to the curtain in a row or a plurality of rows, as illustrated as three rows of weights 51, 52 and 53. The weights 51–53 are attached to the curtain in a way that weight can be added or reduced for the best performance of the curtain, for example, by providing pockets 49 in the curtain into which weights can be inserted or removed. A continuous flexible weight such as a chain can replace the one or more rows. In the illustrated embodiment, the weights 51 of the top row are the heaviest, with the weights 52 of the second row being lighter and the weights 53 of the bottom row being the lightest. Fewer or more than three rows of weights may be used, depending on the depth of the waterbody and flow conditions.

Figure 2A:
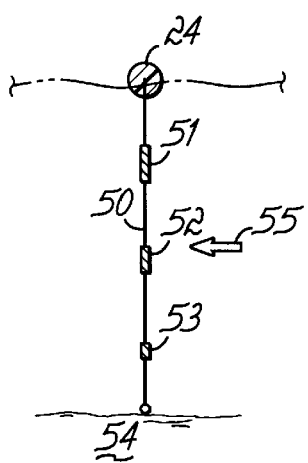
FIGS. 2A–2C is a series of cross-sectional diagrams through the curtain of FIG. 2 illustrating the shape of the curtain under increasing flow conditions.
Figure 2B:
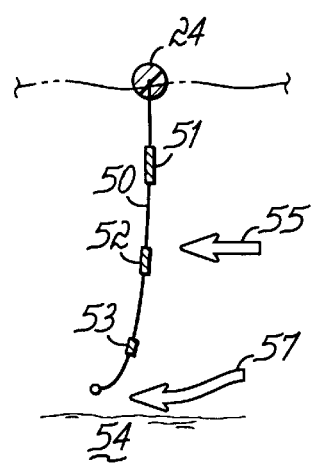
Figure 2C:
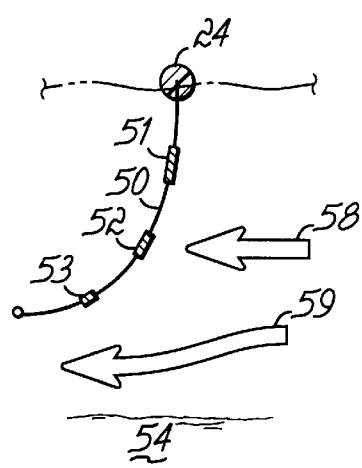

The function of the curtain 50 bearing the weights 51–53 is illustrated in FIGS. 2A–2C, in which FIG. 2A shows the curtain 50 under normal flow conditions, as represented by the arrow 55, with the curtain 50 hanging from the float 24 to the bottom 54 of the waterbody. As the flow increases, as illustrated by the arrow 56 in FIG. 2B, the force of the flowing water overcomes the force of the bottom row of weights 53 and the curtain 50 begins to lift from the bottom 54, allowing excess flow to begin to flow under the curtain 50, as represented by the arrow 57. As flow reaches extreme conditions, as illustrated by the arrow 58 in FIG. 2C, the effects of the heavier weights 52 and 53 are progressively overcome by the force of the flowing water and substantial excess flow thereupon occurs between the bottom of the curtain 50 and the bottom 54 of the waterbody, as represented by arrow 59.

Figure 3:
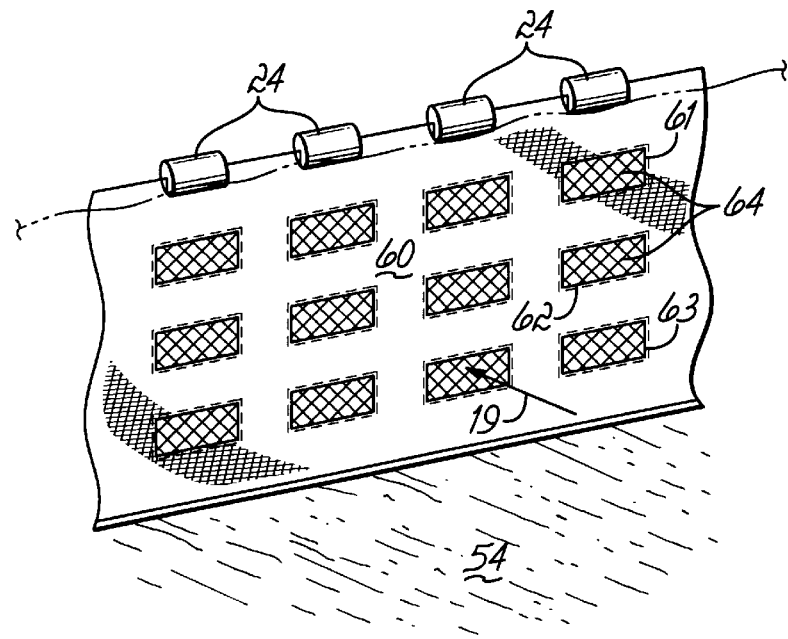
FIG. 3 is a perspective view, similar to FIG. 2, of an alternative embodiment of curtain for a floating system according to principles of the present invention.

FIG. 3 illustrates an alternative curtain 60 to replace the curtain 15b in the system 10b of FIG. 1B. The curtain 60 may be one continuous piece as illustrated in FIG. 1B, and is shown in FIG. 3 as hanging from the floats 24, or may be formed in sections. The curtain 60 may also include the weights such as in the curtain 50 of FIG. 2. The curtain 60, when hanging from the floats 24 to the bottom 54 of the waterbody, prevents most of the flow of water therethrough. However, the curtain 60 has one or more openings therein, such as, for example, an array of windows, shown arranged in a plurality of rows, illustrated as three rows of windows 61, 62 and 63. The windows 61–63 may be of various configurations, numbers and arrangements. Each window is covered with a mesh 64 with openings therein of the same approximate size as, and preferably not larger than, the openings in the mesh of the nets 12a, 12b. The function of the curtain 60 having the windows 61–63 therein is to allow a flow of water from below the surface of the waterbody to flow through the windows 61–63, particularly when the flow rate becomes large, and thus relieves the hydraulic pressure on the curtains 60 and the system. Under normal flow conditions, few floatables are found in water below the surface, but at higher flow rates when floatables are found at greater depths, such floatables are traped by the mesh covering the windows as the flow of water proceeds through the windows.

Figure 4:
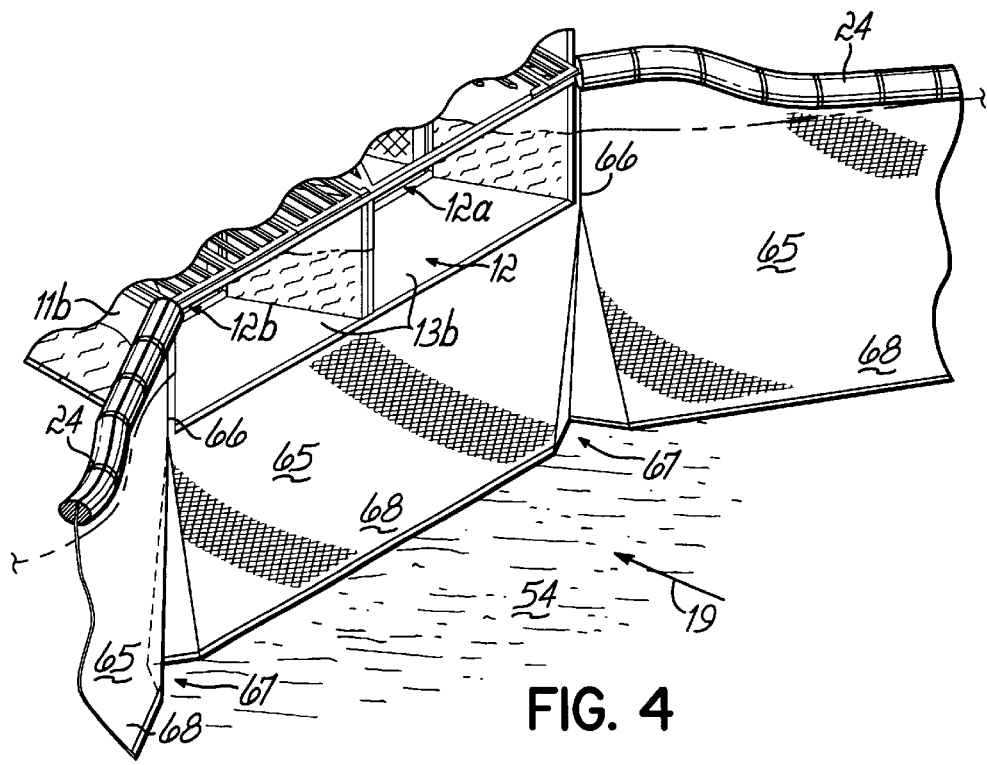
FIG. 4 is perspective view similar to FIGS. 2 and 3, of another alternative embodiment of curtain for a floating system according to principles of the present invention.

FIG. 4 illustrates a curtain 65 having another feature for handling extreme flow conditions that can be used alone with the curtain 15b of FIG. 1B or in combination with the features of the curtains 50 and 60 of FIGS. 2 and 3. The curtain 65 is a continuous curtain or a curtain with separate segments that are joined into a continuous curtain. In either case, joints 66 exist at the lower ends of the junctions where the floats 24 attach to the hull 11b. At the bottom of the curtain 65 at each of the joints 66, a pucker pocket 67 is provided in the flow resistant material of which the curtain is made. The pockets 67 allow the curtain to rest on the bottom 54 of the waterbody when the flow is nominal, but allows a lower end 68 of the curtain 65 to deflect back and lift from the bottom 54 when the flow is high in a manner similar to the bottom of the curtain 50 in FIG. 2C.

Other applications of the invention can be made. Those skilled in the art will appreciate that the applications of the present invention herein are varied, and that the invention is described in preferred embodiments. Accordingly, additions and modifications can be made without departing from the principles of the invention.

Accordingly, the following is claimed:

1. A curtain for a floating debris removal system, comprising:
    a sheet of water flow impeding material configured to extend from the surface of a waterbody toward the bottom thereof to prevent the flow of water and floatable debris around a debris removal unit; and
    means on the curtain for allowing the bottom of the curtain to progressively rise from the bottom of the waterbody in relation to the magnitude of the water flow rate while otherwise being maintained in proximity to the bottom of the waterbody;
    said means including a plurality of weights distributed over the material, the plurality of weights including weights that decrease in magnitude with their distance from the top of the curtain.

2. The curtain of claim 1 wherein:
    said means includes a plurality of windows in the material covered with a mesh.

3. The curtain of claim 1 wherein said means includes:
    a plurality of windows in the material covered with a mesh; and
    a plurality of weights distributed over the material.

4. The curtain of claim 1 wherein:
    the material has at least two vertical joint therein; and
    the curtain has at least two pucker pockets formed therein at the lower extent of each joint.

5. A system for the removal of floatable debris comprising:
    the curtain of claim 1;
    a hull configured to float in a waterbody;
    at least one removeable trap supported by the hull having a mesh net and an inlet opening;
    the curtain being connected to the hull and configured to direct the flow of water into the inlet and impede the flow of water around the inlet between the surface of the waterbody and the bottom.

6. The system of claim 5 wherein:
    said means includes a plurality of windows in the material covered with a mesh.

7. A curtain for a floating debris removal system, comprising:
    a sheet of water flow impeding material configured to extend from the surface of a waterbody toward the bottom thereof to prevent the flow of water and floatable debris around a debris removal unit; and
    means on the curtain for allowing the bottom of the curtain to progressively rise from the bottom of the waterbody in relation to the magnitude of the water flow rate while otherwise being maintained in proximity to the bottom of the waterbody;
    the material having at least one vertical joint therein; and
    the curtain having a pucker pocket formed therein at the lower extent of the joint.

8. The curtain of claim 7 wherein:
    said means further includes a plurality of weights distributed over the material.

9. The curtain of claim 8 wherein:
    the plurality of weights includes weights that decrease in magnitude with their distance from the top of the curtain.

10. The curtain of claim 7 wherein:
    said means further includes a plurality of windows in the material covered with a mesh.

11. The curtain of claim 7 wherein:
    said means further includes a plurality of windows in the material covered with a mesh and a plurality of weights distributed over the material.

12. A system for the removal of floatable debris comprising:
    the curtain of claim 7;
    a hull configured to float in a waterbody;
    at least one removeable trap supported by the hull having a mesh net and an inlet opening;
    the curtain being connected to the hull and configured to direct the flow of water into the inlet and impede the flow of water around the inlet between the surface of the waterbody and the bottom.

13. The system of claim 12 wherein:
    said means further includes a plurality of weights distributed over the material.

14. The system of claim 13 wherein:
    the plurality of weights includes weights that decrease in magnitude with their distance from the top of the curtain.

15. The system of claim 13 wherein:
    said means further includes a plurality of windows in the material covered with a mesh.

16. The system of claim 12 wherein:
    the material has at least two vertical joint therein; and
    the curtain has at least two pucker pockets formed therein, one at a lower extent of each joint.

17. A method of accommodating extreme flow conditions in a floating debris removal system, the method comprising:
    floating a hull on the surface of a waterbody;
    supporting on the hull a trap having an inlet;
    connecting to the hull a curtain having means thereon for allowing the bottom of the curtain to progressively rise from the bottom of the waterbody in relation to the magnitude of the water flow rate while otherwise being maintained in proximity to the bottom of the waterbody, said means being selected from the group consisting essentially of:
        a plurality of weights distributed over the material, the plurality of weights including weights that decrease in magnitude with their distance from the top of the curtain; and
        at least one vertical joint in the material and a pucker pocket at the lower extent of the joint; and, with the curtain:
            directing the flow of water into the inlet of the system;

impeding the flow of water around the inlet between the surface of the waterbody and the bottom of the waterbody; and allowing flow of water around the inlet of the system progressively from the bottom of the waterbody as the flow rate increases above normal, and otherwise maintaining the impeding of the flow in proximity to the bottom of the waterbody.

18. The method of claim 17 further comprising:

providing a curtain having means thereon for allowing the bottom of the curtain to progressively rise from the bottom of the waterbody in relation to the magnitude of the water flow rate while otherwise being maintained in proximity to the bottom of the waterbody.

* * * * *

UNITED STATES PATENT AND TRADEMARK OFFICE
CERTIFICATE OF CORRECTION

PATENT NO. : 6,576,141 B2  
DATED : June 10, 2003  
INVENTOR(S) : Turner, Jr. et al.

It is certified that error appears in the above-identified patent and that said Letters Patent is hereby corrected as shown below:

Column 3,
Line 4, reads "pases" and should read -- passes --.
Line 36, reads "description of the of the" and should read -- description of the --.
Line 54, reads "is a series" and should read -- are a series --.
Line 60, reads "is perspective view" and should read -- is a perspective view --.

Column 5,
Line 41, reads "enclosure tic" and should read -- enclosure 11c --.

Column 7,
Line 45, reads "vertical joint" and should read -- vertical joints --.

Column 8,
Line 45, reads "vertical joint" and should read -- vertical joints --.

Signed and Sealed this

Fourth Day of November, 2003

JAMES E. ROGAN  
*Director of the United States Patent and Trademark Office*